United States Patent [19]

Tomse

[11] Patent Number: 5,112,075

[45] Date of Patent: May 12, 1992

[54] VEHICULAR TOWING SYSTEM

[76] Inventor: John A. Tomse, 380 Esplanade Ave., Pacifica, Calif. 94044

[21] Appl. No.: 615,240

[22] Filed: Nov. 19, 1990

Related U.S. Application Data

[63] Continuation-in-part of Ser. No. 377,550, Jul. 10, 1989, abandoned.

[51] Int. Cl.$^5$ .............................................. B60D 1/14
[52] U.S. Cl. ................................... 280/503; 403/165; 403/1
[58] Field of Search ..................... 280/495, 498, 503; 294/904; 403/1, 164, 165

[56] References Cited

U.S. PATENT DOCUMENTS

| 932,984 | 8/1909 | Hale | 403/164 |
| 4,687,365 | 8/1987 | Promersberger | 403/164 |
| 4,691,934 | 9/1987 | Tomse | 280/503 |

Primary Examiner—Kenneth R. Rice
Assistant Examiner—Mitchell Bompey
Attorney, Agent, or Firm—T. R. Zegree

[57] ABSTRACT

A towing system for a vehicle comprises a coupling frame attachable to the rear end of a towing vehicle and to the front end of the vehicle to be towed. The coupling frame includes a rotatable coupling member which permits independent tilting movement of each fron wheel of the towed vehicle during towing operation thereof.

9 Claims, 2 Drawing Sheets

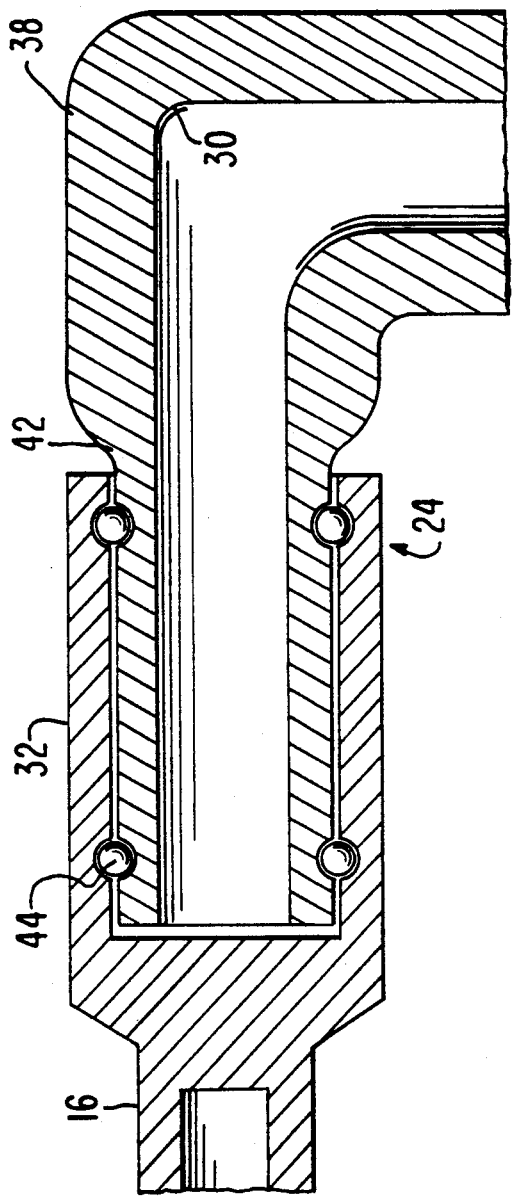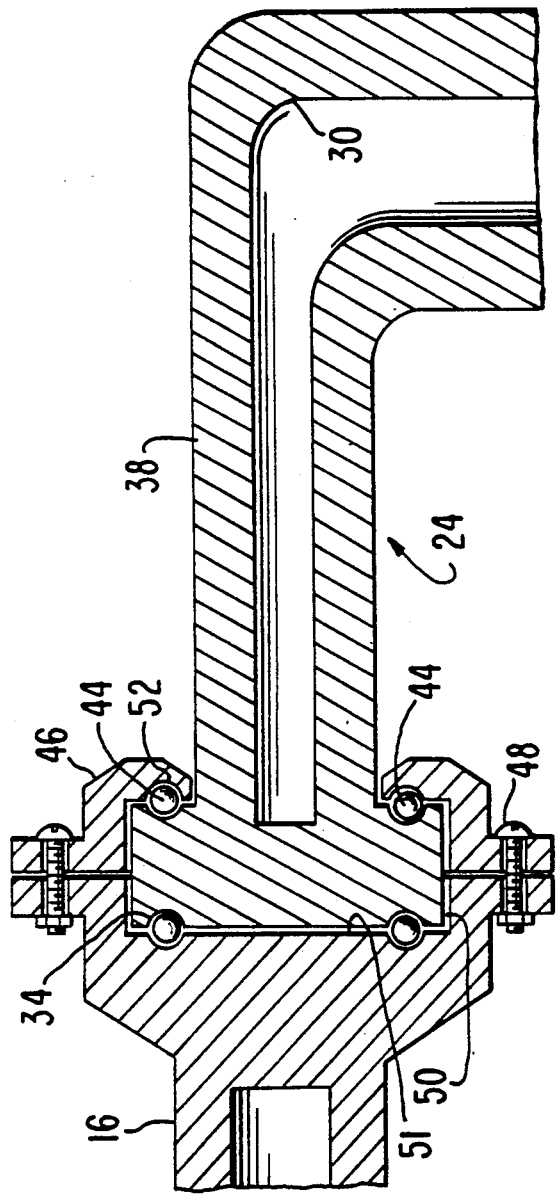
FIG. 3
FIG. 4

VEHICULAR TOWING SYSTEM

BACKGROUND OF THE INVENTION

This invention is a continuation-in-part application of my application Ser. No. 07/377,550, filed Jul. 10, 1989, now abandoned.

The present invention relates to a vehicular towing system. More particularly, the invention relates to a device adapted for joining a towing vehicle with a vehicle to be towed without rotating wheel hubs of the towed vehicle to which the device is attached.

In my U.S. Pat. No. 4,691,934 I have disclosed a towing system for vehicles comprising a tow bearing device for isolating rotation of a wheel with an attached tire from a wheel hub, thereby enabling the vehicle to be towed on all wheels without damage to the automatic transmission or drive train. The device is disposed between the vehicle wheel with an attached tire and a vehicle's wheel hub. This arrangement enables isolation of the rotation of the vehicle wheel from the wheel hub and the coupled automatic transmission, while the vehicle's suspension and its steering system are fully utilized. In the course of towing a vehicle, its rotating wheels remain in perpendicular position relative to the surface of the road regardless of irregularities of the road due to rigidity of both cross bars and side bars incorporated into the structure of the coupling frame.

Other types of towing devices have been described in the patent literature. For example, U.S. Pat. No. 1,435,064 to Holmes describes a device for towing vehicles comprising a tubular casing containing a member of a smaller diameter and a chain for connecting the towing head to the vehicle's axle. U.S. Pat. No. 2,593,692 to Orslind discloses an implement attaching means for securing to the housing of a tractor and for holding against relative angular movement. U.S. Pat. No. 2,702,198 to Gaines teaches a drawbar assembly attached to a conventional tractor rear axle and having a resilient spring associated with a pivot member. U.S. Pat. No. 3,220,749 to Mathisen describes a trailer hitch for connecting a towing vehicle comprising spring bars mounted pivotally to the ball hitch bracket to prevent weaving of both the trailer and the vehicle. U.S. Pat. No. 3,624,811 to Brackett discloses a pair of opposed heads, each pivotally mounted on an end of jaws of a tow bar and means for actuating the opposed jaws.

While my prior patent as well as other prior patents referred to hereinabove disclose various concepts of towing devices, the device of this invention provides a new approach to the structural form of a towing system for vehicles which has certain advantages over the devices of the prior art.

OBJECTS OF THE INVENTION

In view of the foregoing, it is the principal object of this invention to provide an improved vehicular towing system.

Another object of the invention is the provision of a safe and effective towing device which comprises an improved frame connecting a towing vehicle with a vehicle to be towed.

A further object of the invention is to provide a novel frame adapted to be fixedly attached between a towing vehicle and a towed vehicle, the frame including a rotatable means incorporated therein, thereby permitting independent angular movement of wheels of the towed vehicle to be tilted inwardly or outwardly from their normal vertical position during the towing operation.

Still another object of the invention is to provide a towing device for vehicles which enables a towed vehicle to negotiate easily the turns, curves and road surface irregularities during towing thereof.

Still another object of the present invention is the provision of a secure, unitary vehicular towing device of the character described herein which can be manufactured in large quantities at a low cost from readily available materials.

BRIEF SUMMARY OF THE INVENTION

These and other objects of the invention will become more fully apparent from the following description taken in conjunction with the accompanying drawings.

In accordance with the invention, there is provided a vehicular towing system for connecting rear end of a towing vehicle with forward end of a vehicle to be towed comprising a coupling frame having a pair of side bars, each of said side bars including a rotatable coupling member adapted for imparting tiltable movement of front wheels of the vehicle being towed freely and independently of each other in clockwise and counterclockwise direction.

BRIEF DESCRIPTION OF THE DRAWINGS

The invention will be now more fully described with reference to the accompanying drawings, wherein like reference characters designate corresponding elements throughout the views thereof.

FIG. 3 is an enlarged fragmentary crosssectional view of the coupling member according to the invention; and FIG. 4 is an enlarged fragmentary crosssectional view of another embodiment of the coupling member of the invention.

DETAILED DESCRIPTION OF THE INVENTION

Figure 1:
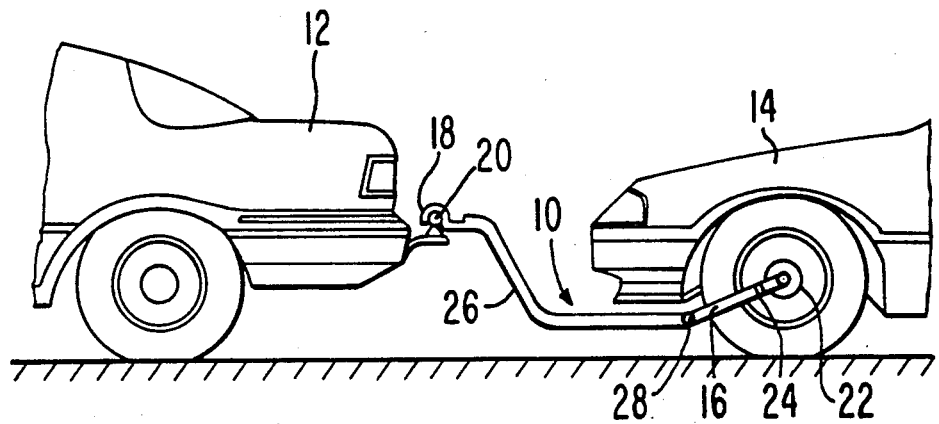
FIG. 1 is a general view of the coupling frame according to the invention connecting a towing vehicle with a towed vehicle, with portions thereof being broken away.

Referring now to the drawings illustrating the invention in preferred embodiments, coupling frame 10, as generally shown in FIG. 1, is attached to hitch 20 of towing vehicle 12 by means of a coupling 18 formed at the front end of coupling frame 10. The opposite rear end of coupling frame 10 is removably attached to wheel hubs 21 oppositely mounted at each side of the forward end of vehicle 14 to be towed. Coupling frame 10 having an angular configuration comprises an S-shaped bar 26, the front end of which terminates in coupling 18 which is secured to hitch 20, whereas the rear end of S-shaped bar 26 is joined to cross bar 28 disposed at a right angle to bar 26 and likewise connected at a right angle to a pair of side bars 16 coupled to steering mechanism (not shown) of the towed vehicle 14 on both front sides thereof. The rear ends of spaced apart side bars 16 are easily installed on vehicle 14 by interposing them between wheel hubs 21 and front wheels 22 having tires mounted thereon using suitable means, such as a bearing assembly (not shown), to provide rotational isolation of both wheels 22 from respective hubs 21 which remain stationary while wheels 22 rotate freely and independently of each other on the road surface during towing operation.

Figure 2:
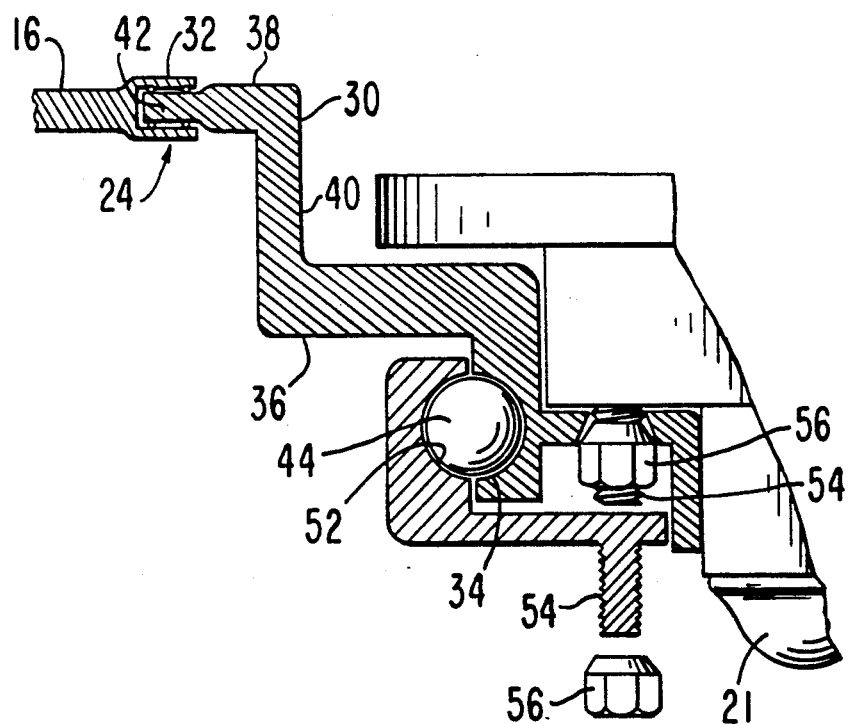
FIG. 2 is an enlarged crosssectional plan view of the coupling frame attached to the towed vehicle's wheel hub, with portions of the assembly being broken away.

It is an important feature of the present invention to provide a novel structure of side bar 16, shown in FIG. 2, by insertion therein of a coupling member 24 which comprises a front section 38 and a rear section 40, the front section 38 having a circular rotatable arm 30 terminating with tapered end 42 inserted into fixed socket 32 constituting the end portion of side bar 16 and adapted to receive arm 30. Tapered end 42 fits substantially snugly in socket 32 leaving sufficient clearance therebetween to insure smooth rotational movement along common longitudinal axis of side bar 16. Rear section 40 of arm 30 is disposed at a right angle in regard to front section 38 as well as with inner hub 36 terminating in inner bearing race 34 at its free end. The preferred rotational means, i.e. standard ball bearings 44, are disposed between inner bearing race 52, the inner bearing 34 being attached to wheel hub 21 by lug nuts 56 and threaded studs 54. Wheel 22 with a tire mounted thereon is coupled to outer bearing assembly 52 likewise by standard nuts 56 and studs 54. The structural details of coupling member 24 are illustrated in FIG. 3 and FIG. 4.

In another embodiment of the invention shown on FIG. 4, coupling member 24 comprises a rotatable arm 30 having front section 38, the end portion of which is formed into a cross member 50 oriented transversely of front section 38 and adapted to fit recess 51 formed in the end portion of side bar 16 for rotational movement therein in common longitudinal axis. Recess 51 is formed by a flange member 46 in association with the cooperating flat surface of the end portion of side bar 16 and secured thereto by suitable fastening means, preferably bolts and nuts 48.

The length of front section 38 of rotatable arm 30 may vary in the range of from about 2 inches to 8 inches, preferably from 3 inches to 6 inches. Although the outer diameter of tapered end 42 of rotatable arm 30 may vary to some extent, it is important that it be slightly smaller than the inner diameter of socket 32 to insure a smooth rotational movement of arm 30. The depth of socket 32 may also vary from about 2 inches to 8 inches as long as rotational stability of arm 30 is maintained. Likewise, the outer dimensions of cross member 50 are somewhat smaller than the inner periphery of recess 51 to insure its even rotation therein.

It will be noted that only such elements of the coupling frame of the invention are shown in the drawings and described herein as necessary to provide an understanding of the structure thereof. Also, the operation of the towing system according to the invention will readily be understood to those skilled in the art or from its description in my U.S. Pat. No. 4,691,934 so that further explanations are believed to be unnecessary.

The coupling frame of the invention can be fabricated from any rigid metal usually employed in the manufacture of automotive parts, such as stainless steel, high-strength aluminum alloy or the like. Portions of the coupling frame can be joined together by welding procedures known in the art. The bearing elements may include preferably ball bearings, although cone bearings, roller bearings or surface bearings are also satisfactory.

It will be apparent from the foregoing description of the invention in its preferred embodiments that I have devised a novel towing means which can advantageously be used in combination all types of motor vehicles, especially those provided with front wheel drive and automatic transmission. The towing system of the invention adapted for joining the suspension system of a towed vehicle to the rear of the towing vehicle is highly efficient and safe to operate, as it permits independent tilting of front wheels of a towed vehicle at about 30° from horizontal plane thus preventing damage to the vehicle being towed with all its wheels on the road surface being rotatably movable in clockwise and counterclockwise direction about axis parallel to the vehicle path without adversely affecting the steering, suspension system and wheel alignment of a towed vehicle. The towing system of this invention further provides partial rotation of the coupling frame in both directions without deviating from the longitudinal axis of the entire length of the side bar along its straight line during towing operation, thus enabling easy cornering of a towed vehicle on uneven road surfaces.

The towing system described hereinabove is characterized by a new combination of structural elements comprising a side bar attachable to the front end of a vehicle to be towed and provided with a unique coupling member comprising a rotatable arm inserted into a fixed socket, the system being useful and highly desirable to individual automobile owners moving to a new residence and especially to companies engaged in the towing service locally or long distance by providing a dependable, damage-free hauling of automobiles or other types of motorized vehicles.

It will be understood that various modifications in the form or in the constructional details of the invention as herein described may be made without departing from the spirit thereof or the scope of the claims which follow.

I claim:

1. A vehicular towing system for connecting a rear end of a towing vehicle with a forward end of a vehicle being towed comprising a coupling frame gaving a pair of side bars, each of said side bars including a rotatable coupling member adapted to allow tiltable movement of front wheels of said towed vehicle freely and independently of each other, said wheels being rotatably moveable on a road surface about an axis parallel to a path of said towed vehicle in a clockwise and counterclockwise direction, said coupling member comprising a front section having a rotatable arm and end portion having a fixed socket, said rotatable arm being inserted into said fixed socket to insure a smooth rotational movement therein.

2. The towing system of claim 1 wherein said front wheels are tiltable about 30° relative to a horizontal plane during towing of the vehicle.

3. The towing system of claim 1 wherein said coupling frame further comprises coupling means for securing to a hitch of said towing vehicle, an S-shaped bar and a cross bar connecting said S-shaped bar with said coupling member.

4. The towing system of claim 1 wherein the depth of said socket is from about 2 inches to about 8 inches.

5. The towing system of claim 1 wherein said rotatable arm includes a front section terminating with a tapered end adapted to fit into said socket for rotation therein and a rear section disposed at a right angle in regard to said front section.

6. The towing system of claim 1 wherein said coupling member comprises a rotatable arm having a cross member forming an end portion thereof and adapted to fit into a recess in said side bar for rotational movement therein.

7. The towing system of claim 6 wherein said recess is formed by a flange member in association with an end portion of said side bar fastened thereto.

8. A towing system of claim 1 wherein the rear end of said coupling frame is adapted for attachment to wheel hubs of said towed vehicle.

9. In combination, a towing vehicle and a towed vehicle joined by a vehicular system for connecting a rear end of a towing vehicle with a forward end a vehicle being towed comprising a coupling frame having a pair of side bars, each of said side bars including a rotatable coupling member adapted to allow tiltable movement of front wheels of said towed vehicle freely and independently of each other, said wheels being rotatably moveable on a road surface about an axis parallel to a path of said towed vehicle in a clockwise and counter-clockwise direction, said coupling member comprising a rotatable arm inserted into a fixed socket adapted to receive said arm.

* * * * *